(12) United States Patent
Michels

(10) Patent No.: US 7,746,785 B2
(45) Date of Patent: Jun. 29, 2010

(54) TIME MULTIPLEXING LOGIC IN PHYSICAL DESIGN DOMAIN FOR MULTIPLE INSTANTIATION

(75) Inventor: Peter Michels, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 895 days.

(21) Appl. No.: 11/507,670

(22) Filed: Aug. 22, 2006

(65) Prior Publication Data

US 2007/0195757 A1 Aug. 23, 2007

Related U.S. Application Data

(60) Provisional application No. 60/709,815, filed on Aug. 22, 2005.

(51) Int. Cl.
*H04L 12/56* (2006.01)
*H04J 3/02* (2006.01)
*H03K 19/173* (2006.01)

(52) U.S. Cl. ................ 370/235; 370/391; 370/532; 370/538; 326/38

(58) Field of Classification Search ............. 370/498, 370/532, 535–545, 235, 301, 391–392; 710/1, 710/20–21, 36, 58; 712/223
See application file for complete search history.

(56) References Cited

U.S. PATENT DOCUMENTS

| | | | | |
|---|---|---|---|---|
| 5,646,545 A | * | 7/1997 | Trimberger et al. | 326/38 |
| 5,761,483 A | * | 6/1998 | Trimberger | 716/2 |
| 6,480,954 B2 | * | 11/2002 | Trimberger et al. | 713/1 |
| 7,016,354 B2 | * | 3/2006 | Vangal et al. | 370/392 |
| 7,330,924 B1 | * | 2/2008 | Kao et al. | 710/305 |
| 2008/0013457 A1 | * | 1/2008 | Berman et al. | 370/245 |

* cited by examiner

*Primary Examiner*—Tri H Phan

(57) ABSTRACT

An apparatus and method are provided to perform a time multiplexing logic in a module, are provided including identifying a driving flop and a receiving flop in the module, receiving a modified input signal, and identifying a worst case timing path for the modified input signal to transmit from the driving flop to the receiving flop. The time multiplexing logic of the apparatus and method further identifies a predetermined point of the worst case timing path, and inserts a logic unit at the predetermined point allowing the time multiplexing logic circuit to process and output the modified input signal at a maximum frequency.

40 Claims, 7 Drawing Sheets

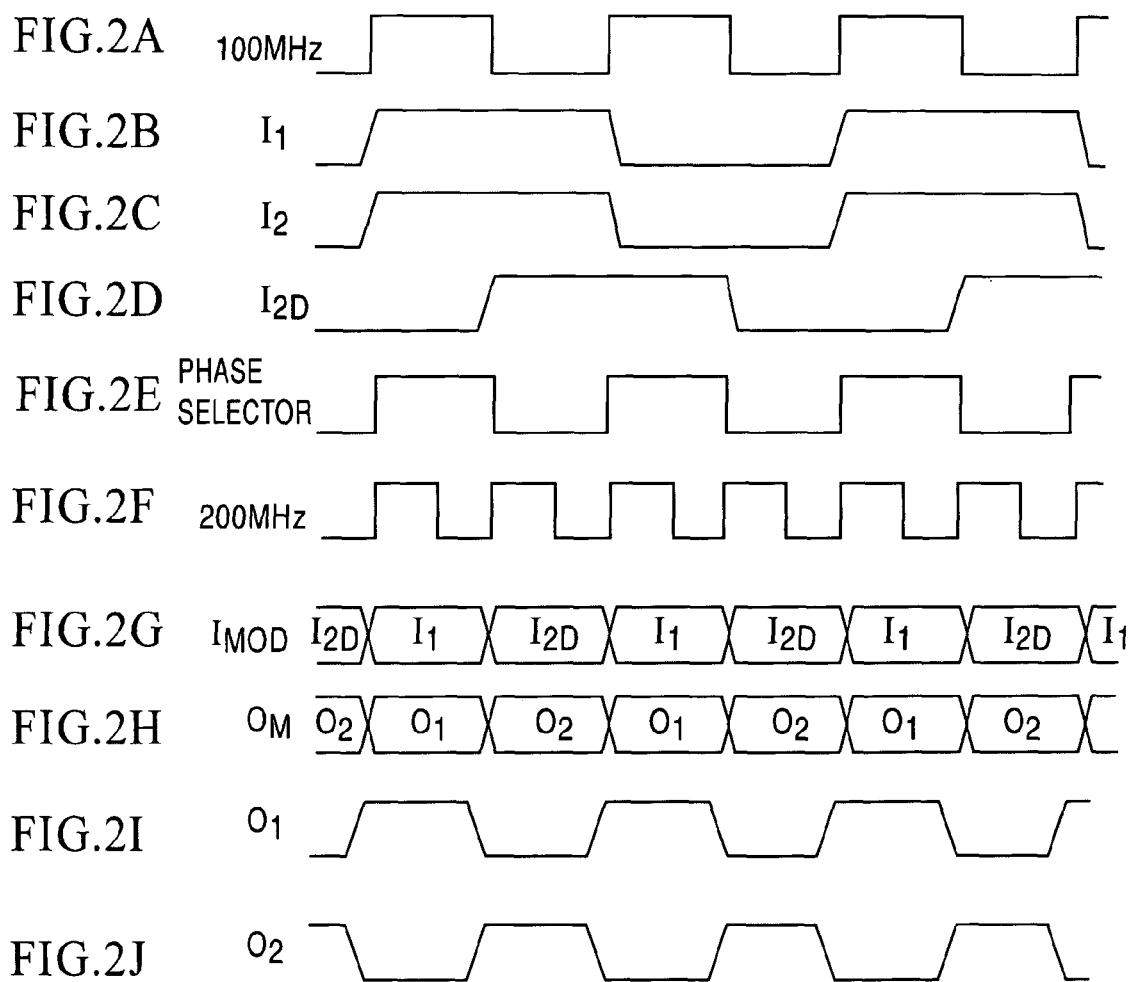

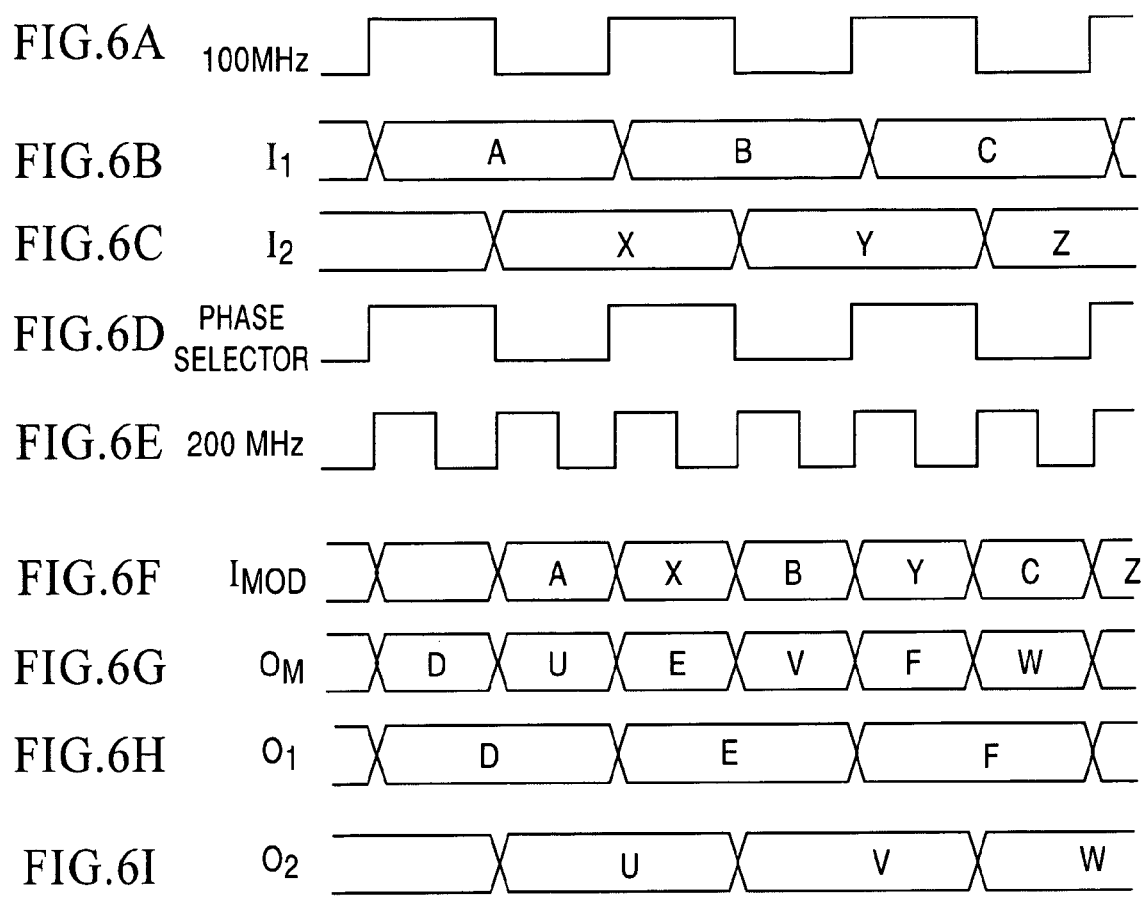

TIME MULTIPLEXING LOGIC IN PHYSICAL DESIGN DOMAIN FOR MULTIPLE INSTANTIATION

CROSS-REFERENCE TO RELATED APPLICATIONS

This application claims priority from provisional application No. 60/709,815, filed Aug. 22, 2005. The disclosure of the prior application is hereby incorporated by reference herein in its entirety.

BACKGROUND OF THE INVENTION

1. Field of the Invention

The present invention relates to an apparatus and a method to time multiplex logic in a physical design domain instead of multiple instantiation.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous Institute of Electrical and Electronic Engineers (IEEE) Ethernet standards, is one example of computer networking technology which has been able to be modified and improved to remain a viable computing technology.

Switches, as they relate to computer networking and to Ethernet, are hardware-based devices which control the flow of data packets or cells based upon destination address information which is available in each packet. A properly designed and implemented switch or module should be capable of receiving a packet and switching the packet to an appropriate output port at what is referred to wirespeed or linespeed, which is the maximum speed capability of the particular network. As speed has increased, design constraints and design requirements have become more and more complex with respect to following appropriate design and providing a low cost, commercially viable solution. For example, conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed. Additionally, as network modules have become more and more complicated with respect to requiring rules tables and memory control, an increase in the amount of hardware is necessary to enable higher processing speed and the various chips to communicate with each other. A network module is needed in which logic components may be multiplexed thereby significantly reducing the amount of logic needed.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which:

FIGS. 2A to 2J illustrate multi-stage switch configuration signals, in accordance with an embodiment of the present invention;

FIGS. 6A to 6I illustrate the multi-stage switch configuration signals, in accordance with an alternative embodiment of the present invention.

DETAILED DESCRIPTION OF THE PREFERRED EMBODIMENTS

Reference will now be made in detail to the preferred embodiments of the present invention, examples of which are illustrated in the accompanying drawings. The present invention described below provides a time multiplexing logic in a physical design domain for multiple instantiation.

In a conventional logic circuit, the number of logic components used are large as well as the number of storage components in order to process and output signals. For instance, to receive two instances of data input signals, $Input_1$, and $Input_2$, two modules may be used. Each module would receive and process the input signals, $I_1$ and $I_2$, respectively. Each module would include conventional storage and logic components, such as original or existing flops, that may be electrically coupled to digital circuits. Each original module receives an input signal and output a corresponding output signal.

Rather than providing two modules, in accordance with an embodiment of the present invention, a single module may be provided including a time multiplexing logic that would be modified so that both input signals are received and processed at a maximum frequency.

Figure 1:
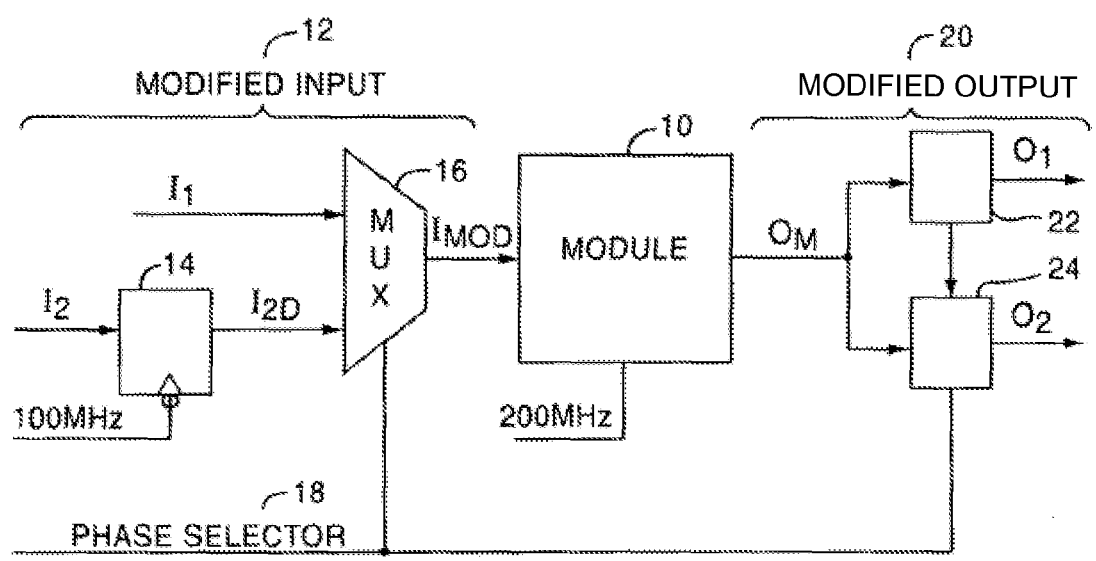
FIG. 1 illustrates a module including a time multiplexing logic circuit, in accordance with an embodiment of the present invention.

FIG. 1 illustrates a module 10 including a time multiplexing logic circuit, in accordance with an embodiment of the present invention. As illustrated in FIG. 1, rather than providing two separate modules, a single module 10 may be provided including the time multiplexing logic circuitry, to be later described in FIGS. 3A and 3B. A modified input circuitry 12 is operatively connected at an input side of the module 10. A modified output circuitry 20 is operatively connected at an output side of the module 10.

The modified input circuitry 12 includes a delay unit 14, such as a latch, and a multiplexer 16. In the modified output side of the module 10, a demultiplexer circuit 22, 24 is provided including two latch units 22, 24. The delay unit 14 delays at least one of first and second input signals, $I_1$, and $I_2$, by a programmable period of time, such as half a clock cycle, prior to being multiplexed. FIG. 2A illustrates a clock frequency of 100 MHz and FIGS. 2B and 2C illustrates the first and second input signals, $I_1$ and $I_2$, respectively. In an exemplary embodiment, the second input signal, $I_2$, may be selected to be delayed by the programmable period of time. As shown in FIG. 1 and FIG. 2D, the second input signal, $I_2$, is delayed by half of the original clock frequency of 100 MHz. If multiple clocks are involved in the module, the clock frequency would be scaled using conventional scaling procedures.

The first input signal, $I_1$, and the delayed second input signal, $I_{2D}$, are multiplexed in order to be able to be processed at a higher frequency. Accordingly, the multiplexer 16 receives the first input signal, $I_1$, and the delayed second input signal, $I_{2D}$. The multiplexer 16 multiplexes the first input signal, $I_1$, and the delayed second input signal, $I_{2D}$, and outputs a modified input signal, $I_{MOD}$.

A phase selector 18 is provided to select a phase for the multiplexer 16 to output the modified input signal, $I_{MOD}$, and to select the phase of the output signals, $O_1$ and $O_2$, from the demultiplexer circuit 22, 24 in the modified output circuit 20, to be later described. The phase selector 18 may either provide the same phase for the multiplexer 16 and the demultiplexer circuit 20 or may be set up to control and provide different phases to the multiplexer 16 and the demultiplexed output signals, $O_1$ and $O_2$. For instance, as illustrated in FIG. 2E, the phase selector 18 may select a second phase signal from the multiplicity of second phase signals in response to a second select signal or may select a first phase signal from the multiplicity of first phase signals in response to a first select signal.

Because one logic module 10 is used to process the first input signal, $I_1$, and the delayed second input signal, $I_{2D}$, one of the many advantages of the present invention is that the amount of hardware logic is reduced, thereby improving costs and improving performance. Although one module 10 is illustrated in FIG. 1, a person of ordinary skill in the art would appreciate that multiple modules may be provided, where each module would process at least two input signals.

Referring back to the multiplexer 16, the modified input signal, $I_{MOD}$, is output from the multiplexer 16 to the module 10. In accordance with an embodiment of the present invention, the input signals, $I_1$, and $I_2$, may be processed at a frequency at least double, i.e., 200 MHz as illustrated in FIG. 2F, to the frequency used by conventional modules. For instance, the multiplexer 16 may output the modified input signal, $I_{MOD}$, at a frequency of 200 MHz, as illustrated in FIG. 2G. In order to process the modified input signal, $I_{MOD}$, at a maximum frequency of, for instance, 200 MHz, the module is configured to include the time multiplexing logic circuitry as illustrated in FIGS. 3A and 3B.

Figure 3A:
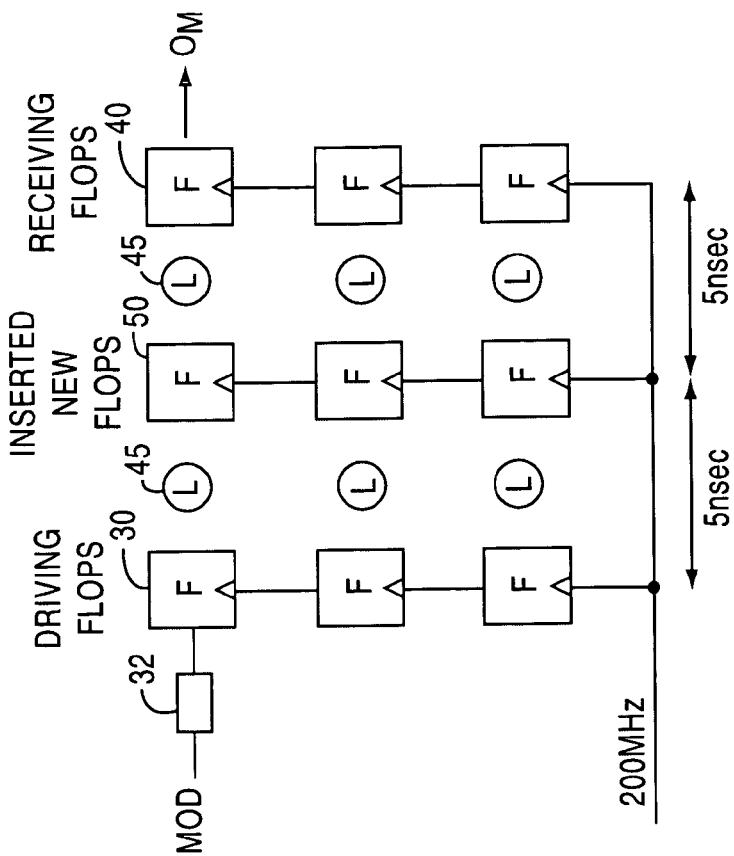
FIGS. 3A and 3B illustrate a configuration of the time multiplexing circuit in the module, in accordance with an embodiment of the present invention.
Figure 3B:
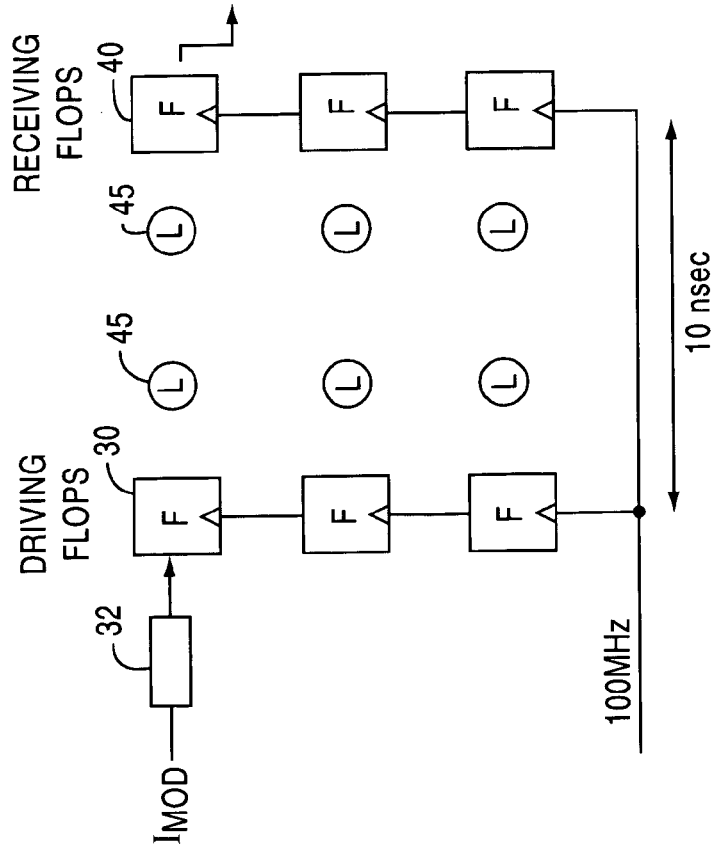

Specifically, FIGS. 3A and 3B illustrate a configuration of the time multiplexing circuit in the module 10, in accordance with an embodiment of the present invention. The time multiplexing circuit may include driving flops, receiving flops, and additional logic units therebetween. Each driving flop would receive a modified input signal corresponding to a different module. For illustrative purposes, a first flop 30 of the driving flops receives the modified input signal, $I_{MOD}$, from FIG. 1. Also, although one modified input circuit arrangement is provided outputting a single modified input signal, multiple modified input circuits may be provided where each circuit would generate a modified input signal, which is processed similarly to the modified input signal, $I_{MOD}$, illustrated in FIG. 2G. In the event that multiple modified input circuits are provided, multiple driving flops in the module would be provided, as illustrated in FIG. 3A, each receiving a modified input signal associated with a different modified input circuit. For purposes of brevity, as illustrated in FIG. 3A, one driving flop 30 of the driving flops receives the modified input signal, $I_{MOD}$, from the modified input circuit illustrated in FIG. 1, and one receiving flop 40 of the driving flops receives and outputs the modified input signal after being processed through logic units or cells 45.

Accordingly, the modified input signal, $I_{MOD}$, is received by a storage unit 32 to store the signal therein and is transmitted therefrom to the driving flop 30. The driving flop 30 transmits the modified input signal, through various cells or logic units 45 along the way, to the receiving flop 40. In the time multiplexing logic circuit, the modified input signal, $I_{MOD}$, may typically take too much time to propagate from the driving flops 30 through the cells 45 to arrive at the receiving flops 40. To resolve propagation delays and improve area and power consumption, during set-up, prior to sending the modified input signal through the driving flops, the logic gates, and the receiving flops in the time multiplexing logic circuit, the time multiplexing logic circuit identifies a worst case timing path (TP) from the driving flop 30 that would receive the modified input signal, $I_{MOD}$, to the receiving flop 40 programmed to receive and output the modified input signal, $I_{MOD}$. The worst case timing path (TP) is defined as a path through which the modified input signal would take the longest time to travel from the driving flop 30 through the logic units 45 to the receiving flop 40.

Once a first worst case timing path (TP) is identified, as illustrated in FIG. 3B, a latch or a flop 50 is then inserted at a midpoint of the first worst case timing path (TP). Once the latch or the flop 50 is inserted at the midpoint of the first worst case timing path (TP), the time multiplexing logic determines a second worst case timing path (TP) between the driving flop 30, the inserted midpoint flop or latch 50, and the receiving flop 40. Another latch or flop would then be inserted at the midpoint of the second worst case timing path (TP)

Thus, a number of new flops or latches may be included in every worst case timing path between driving and receiving logic gates at a predetermined timing point, such as the midpoint. In a simplest form, one new flop may be added at every midpoint of the worst case timing path identified between original flops (i.e., driving flops and receiving flops). The time multiplexing logic may be repeated a preset number of times or until the timing path of the modified input signal between the original flops is acceptable for a particular application. Accordingly, for each additional path, new flops or latches are added to break all paths between the driving flop and the receiving flop. The process of adding or inserting new flops between the driving flops and the receiving flops may be repeated between additional worst case timing paths that may be found either between the driving flop and a new flop, between the new flop and the receiving flop, and/or between other logic units in the modified module 10.

In addition, in terms of timing, the time multiplexing logic provides a location for additional storage components, such as latches and flops, that may be inserted at appropriate positions between existing logic gates in the module 10 so that a maximum frequency may be applied to the modified input circuit 12, the module 10, and the modified output circuit 20. For instance, as illustrated in FIGS. 3A and 3B, if the time multiplexing logic circuit is running with a 100 MHz clock frequency, if the worst time period from the driving flops 30 to the receiving flops 40 is determined to be 10 ns, the new flops 50 would be positioned at a 5 ns point. Thus, new flops 50 may be inserted at a half-way point, for instance, between the driving flops 30 and the receiving flops 40 or between existing cells or logic units 45. A script, such as in a static timing tool well-known in the industry, e.g., the Synopsis Primetime static timing tool, can identify appropriate positions by analyzing timing reports and netlists.

In an alternative embodiment, rather than inserting one set of new flops, multiple sets of flops may be inserted depending on the logic in place in the time multiplexing logic circuit. Sometimes the number of new flops between driving flops and receiving flops may be double or a predetermined number to further optimization. For instance, for the 10 ns worst time period, a first set of new flops may be inserted at 3 ns and a second set of new flops may be inserted at 6 ns. In addition, once the new flops are inserted in the time multiplexing logic circuit, the clock cycle may be increased to 200 MHz, for instance. Thus, in accordance with an embodiment of the present invention, twice the original clock frequency may be applied.

Once it is determined that sufficient flops or latches 50 have been inserted to allow the time multiplexing logic circuit in the module 10 to operate at twice the original frequency, for instance, the module 10 would receive the modified input signal, $I_{MOD}$, from the modified input circuit 12, process the modified input signal, $I_{MOD}$, through the driving flop 30, logic units 45, the inserted new flops or latches 50 to the receiving flop 40. The receiving flop 40 would then output an output signal, $O_M$, to the modified output circuitry 20, as illustrated in FIG. 2H. The output signal, $O_M$, is a multiplexed signal being output from the module 10 at the higher or maximum clock frequency of, for instance, 200 MHz. The demultiplexer circuitry (i.e., both latches 22, 24), for instance, would demultiplex the output signal, $O_M$, at a same phase as the phase of the multiplexer 16. The output signal, $O_M$, would be demultiplexed as the first output signal, $0_1$, as illustrated in FIG. 2I, and the second output signal, $O_2$, as illustrated in FIG. 2J.

Thus, in accordance with an embodiment of the present invention, although existing driving and receiving flops may remain at their original frequency, in accordance with an embodiment of the present invention, the addition of new flops or latches allows the time multiplexing logic circuit to double the original clock frequency. In addition, a person of ordinary skill in the art will appreciate that in the event that new flops or latches are inserted after the receiving flop, in a next clock frequency, the receiving flop becomes the driving flop and the new flop or latch becomes the receiving flop and the process of adding or inserting new flops therebetween repeats.

Figure 4A:
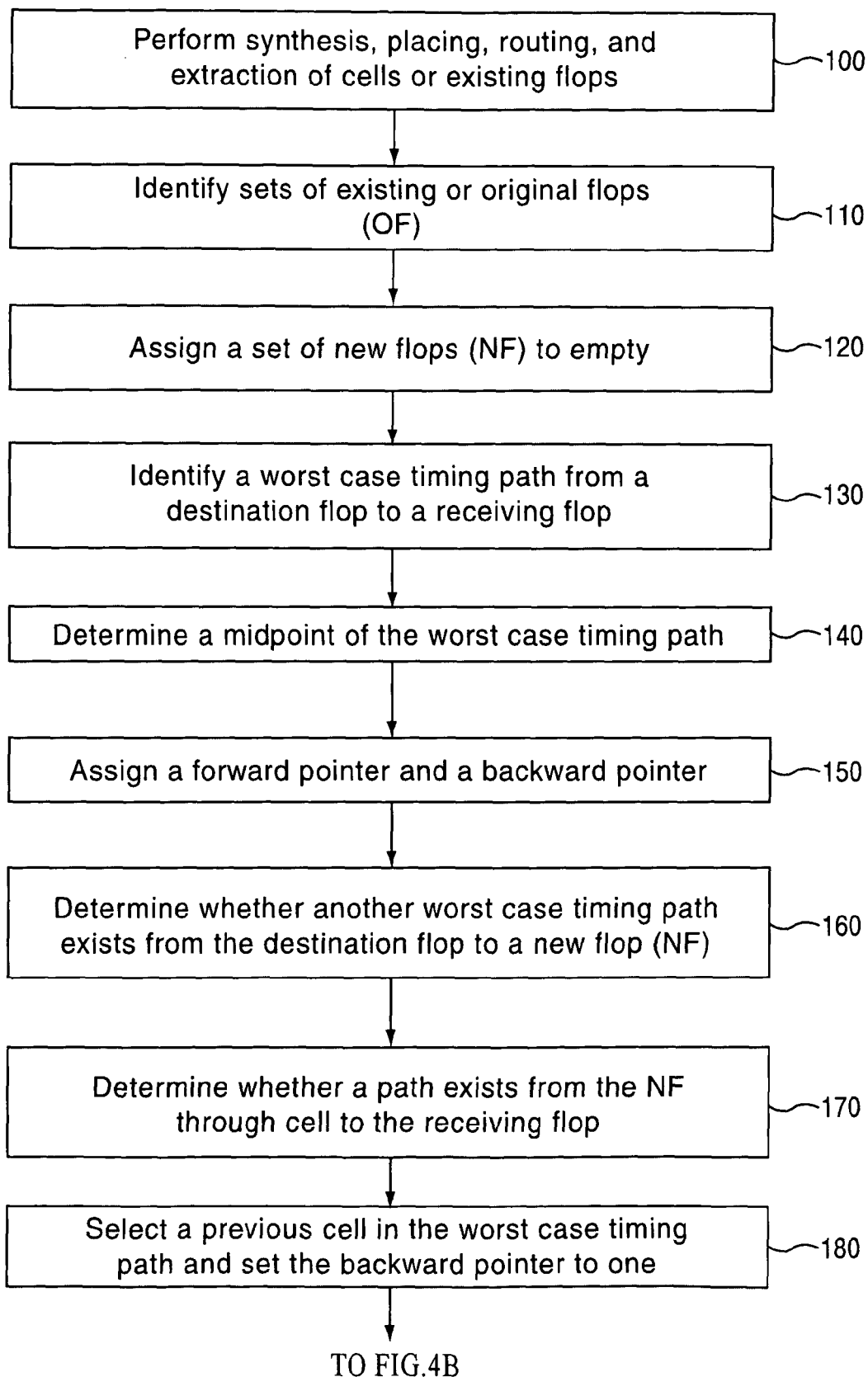
FIGS. 4A and 4B illustrate a method performing the time multiplexing logic in the module, in accordance with an embodiment of the present invention.
Figure 4B:
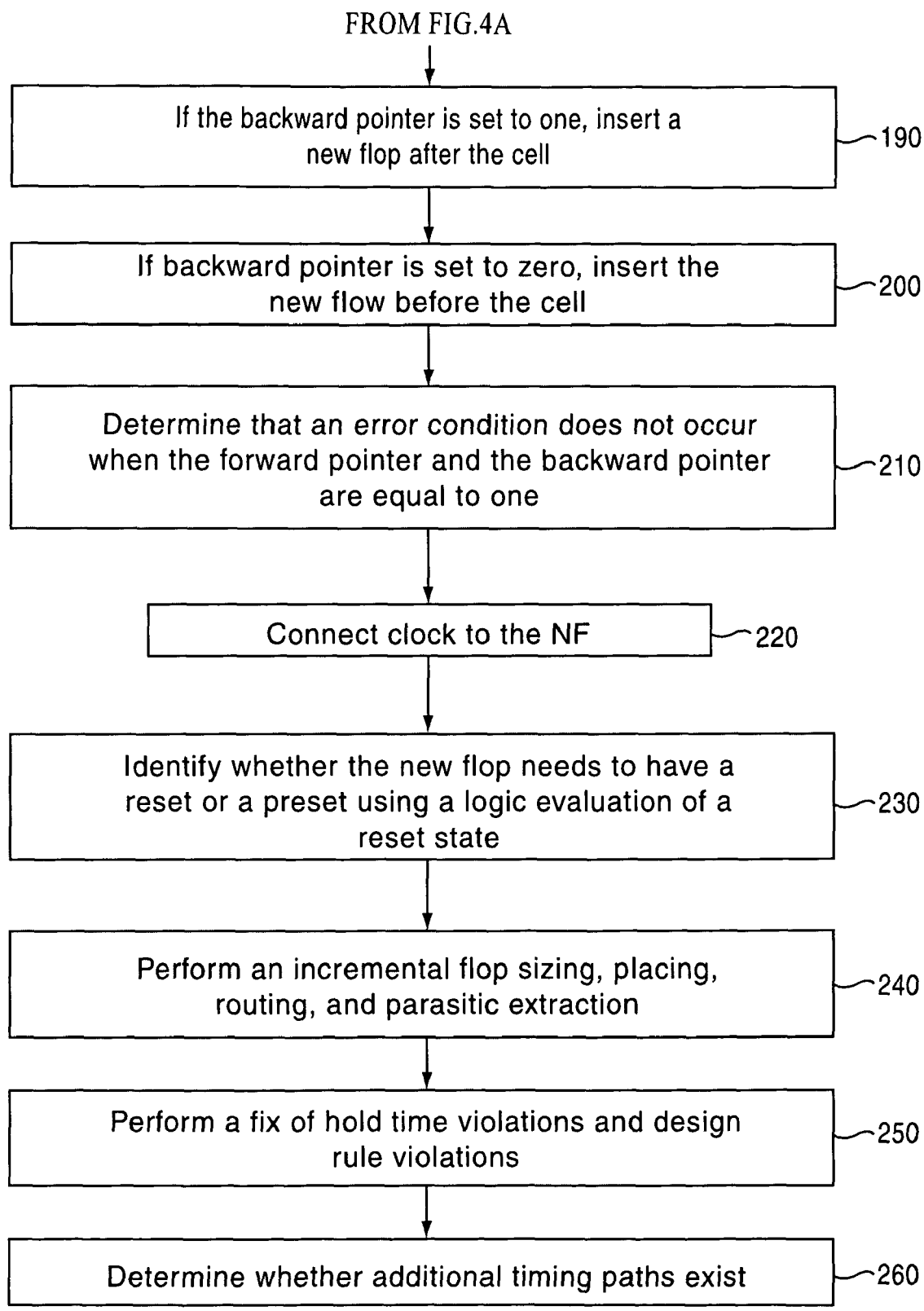

FIGS. 4A and 4B illustrate a method performing the time multiplexing logic in the module 10, in accordance with an embodiment of the present invention. The module 10 including the time multiplexing logic may include a microprocessor to execute the method described in FIGS. 4A and 4B. At operation 100, the method performs a synthesis, placing, routing, and extraction of cells or logic units with multiple outputs, existing flops that have internal logic feedback paths, and existing flops that have internal logic input to output paths. At operation 110, the method identifies sets of existing or original flops (OF), which include the driving flops and the receiving flops. At operation 120, the method assigns a set of new flops (NF) to empty. At operation 130, the method identifies a worst case timing path (TP) from an original flop (OF) (i.e., driving flop) to another original flop (OF) (i.e., receiving flop). Once the method identifies the worst case timing path (TP), at operation 140, the method determines or identifies the midpoint, for instance, of the worst case timing path (TP). A person of ordinary skill in the art will appreciate that, depending on the particular application, any intermediate point along the worst case timing path (TP) may be identified. At operation 150, a forward pointer is assigned to be equal to zero and a backward pointer is assigned to be equal to zero.

At operation 160, if another worst case timing path (TP) exists from the OF through a logic unit or cell to the new flop (NF), then a next cell is selected in the worst case timing path (TP) and the forward pointer is set to one. Operation 160 may be repeated to determine each path existing between each OF and NF. At operation 170, the method determines whether a worst case timing path (TP) exists from the NF through a cell to the OF (i.e., receiving flop). If the worst case timing path (TP) exists from the NF through the cell to the OF, then, at operation 180, the method selects a previous cell in the worst case timing path (TP) and the backward pointer is set to one. Operations 170-180 may be repeated to determine each worst case timing path (TP) existing between each NF and OF.

From operation 180, the process proceeds to operation 190 illustrated in FIG. 4B. At operation 190, if the backward pointer is set to one, the method inserts a new flop or latch after the cell. Otherwise, at operation 200, if the backward pointer is set to zero, the method inserts a new flop or latch before the cell. At this time, the worst case timing path (TP) is broken with the insertion of the new flop or latch. Possibly other paths between the OF (i.e., driving flop) and the OF (i.e., receiving flop) may be broken as well. At operation 210, if the method determines that the forward pointer and the backward pointer are equal to one, then the method determines that an error condition did not occur. Another error check may be performed, using conventional error check methods or procedures, to determine whether there are any errors in the worst case timing path (TP) to or from the NF.

At operation 220, the method connects the clock to the NF, wherein the clock would be set to operate at twice the frequency of conventional modules. At operation 230, the method identifies if the NF needs to have a reset or a preset using a logic evaluation of a reset state. At operation 240, the method performs an incremental flop sizing, placing, routing, and parasitic extraction. At this time, scan chain insertion may be required for circuit designs using scan. At operation 250, the method performs a fix of any hold time violations and design rule violations that may have been introduced during the insertion of the new flop (NF).

At operation 260, the method determines whether additional timing paths (TP) exist between OF to OF. If additional paths exist, the method returns to operation 130. Accordingly, after repeating operations 130 to 260 for each additional path, enough new flops are added to break all paths between OFs. In accordance with an embodiment of the present invention, an additional area/cost optimization is to identify clusters of flops that could be converted to SRAM/FIFO. An additional error check after the above flow is to make sure no paths exist from (NF) to (NF). In accordance with an alternative embodiment of the present invention, latches may be inserted instead of flops or other similar logic units. Latches may be inserted in pairs. Ideally latches may be spaced so that the worst case timing path hits a center of the latch flow through a time period.

The method of adding or inserting new flops between driving flops and receiving flops may be repeated between the same timing path between the driving flop and the new flop and/or the timing path between the new flop and the receiving flop. Therefore, in accordance with an embodiment of the present invention, in the time multiplexing logic circuit of the module, latches and/or flops may be inserted at appropriate positions between existing logic gates so that a maximum frequency may be applied to the time multiplexing logic circuit.

In accordance with an embodiment of the present invention, the set of new flops (NF) may prevent straight-forward formal equivalency checking. One solution is to have flops in a library of the module that are equivalent but have a different name. These flop cells may be used for new flop insertion. The library for equivalency checking may be modified so that the new cell description is a wire from data-in to data-out.

In addition, the method illustrated in FIGS. 4A and 4B may need adjustments for scan/test requirements. A scan chain may need to be rebalance for length. The above flow requires that scan/test development be done on the modified netlist. An alternate solution is to insert new flops that have a pass through mode from data-in to data-out when scanning is enabled.

Custom logic units or cells within a module, such as RAMs, may need replication. If holding flops are implemented, these flops may need to be disallowed and may need more delay margin when delaying the input signal or signals.

Figure 5:
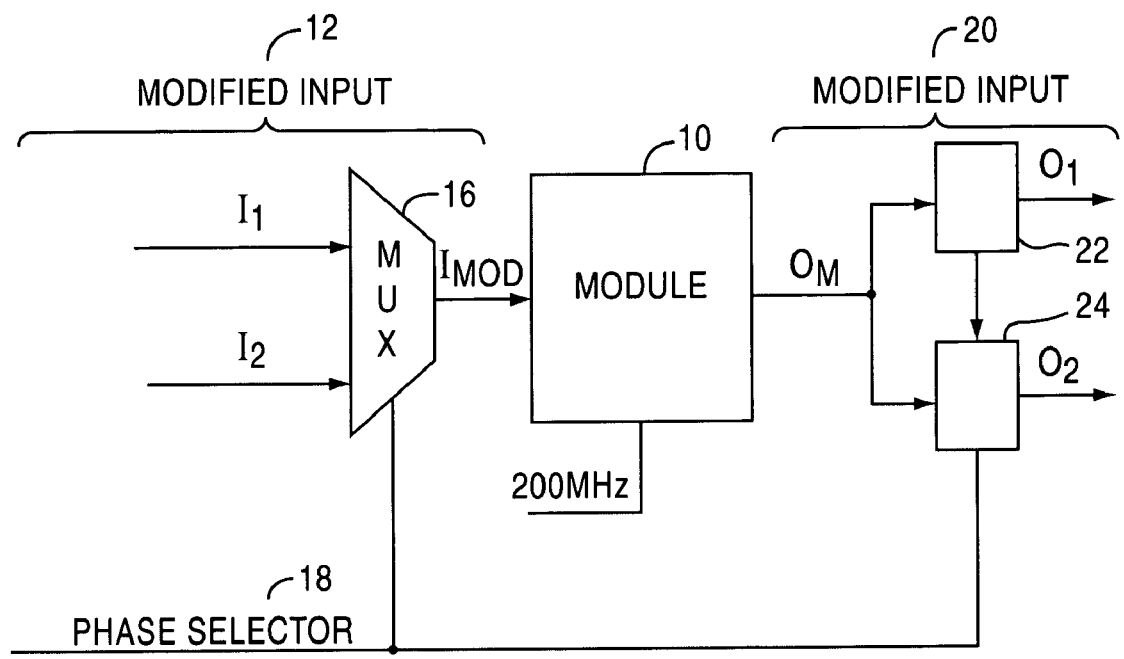
FIG. 5 illustrates the module including the time multiplexing logic circuit, in accordance with an alternative embodiment of the present invention.

FIG. 5 illustrates the module 10 including the time multiplexing logic circuit excluding a delay unit, in accordance with an alternative embodiment of the present invention. The description of the module 10 and the configuration of the time multiplexing circuit in the module 10 illustrated in FIGS. 1, 3A, and 3B are same as for FIG. 5, thus, a description thereof is incorporated herein. As illustrated in FIG. 5, rather than providing two separate modules, the single module 10 may be provided including the time multiplexing logic circuitry. Similarly to FIG. 1, the modified input circuitry 12 is operatively connected at the input side of the module 10. The modified output circuitry 20 is operatively connected at an output side of the module 10.

The modified input circuitry 12 includes the multiplexer 16. In the modified output side of the module 10, the demultiplexer circuit 22, 24 is provided including two latch units 22, 24. FIG. 6A illustrates a clock frequency of 100 MHz and FIGS. 6B and 6C illustrates the first and second input signals, $I_1$, and $I_2$, respectively, each same or different from the other. For illustrative purposes, the first and second input signals, $I_1$, and $I_2$, are shown to be out of phase. Also, the first and second input signals, I1 and I2, each may be a differential signal that may combine two signal levels into one input. FIGS. 6B and 6C are another way of denoting the signal values from FIGS. 2B and 2C. The values may be high, low or even a bus of multiple values. The variables A, B, C, X, Y, Z denote the signal value is variable. As shown in FIG. 6A, the first input signal, $I_1$, includes the values A, B, and C and the second input signal, $I_2$, includes the values X, Y, and Z.

The first input signal, $I_1$, and the second input signal, $I_2$, are multiplexed in order to be able to be processed at a higher frequency. Accordingly, the multiplexer 16 receives the first input signal, $I_1$, and the second input signal, $I_2$. The multiplexer 16 multiplexes the first input signal, $I_1$, and the second input signal, $I_2$, and outputs a modified input signal, $I_{MOD}$.

A phase selector 18 is provided to select a phase for the multiplexer 16 to output the modified input signal, $I_1$, and to select the phase of the output signals, $O_1$, and $O_2$, from the demultiplexer circuit 22, 24 in the modified output circuit 20. The phase selector 18 may either provide the same phase for the multiplexer 16 and the demultiplexer circuit 20 or may be set up to control and provide different phases to the multiplexer 16 and the demultiplexed output signals, $O_1$ and $O_2$. For instance, as illustrated in FIG. 6D, the phase selector 18 may select a second phase signal from the multiplicity of second phase signals in response to a second select signal or may select a first phase signal from the multiplicity of first phase signals in response to a first select signal.

Referring back to the multiplexer 16, the modified input signal, $I_{MOD}$, is output from the multiplexer 16 to the module 10. In accordance with an embodiment of the present invention, the input signals, $I_1$, and $I_2$, may be processed at a frequency at least double, i.e., 200 MHz as illustrated in FIG. 6E, to the frequency used by conventional modules. For instance, the multiplexer 16 may output the modified input signal, $I_{MOD}$, at a frequency of 200 MHz, as illustrated in FIG. 6F, including a combination of the values A, X, B, Y, C, and Z. In order to process the modified input signal, $I_{MOD}$, at a maximum frequency of, for instance, 200 MHz, the module is configured to include the time multiplexing logic circuitry as illustrated in FIGS. 3A and 3B.

Also, although one modified input circuit arrangement is provided outputting a single modified input signal, multiple modified input circuits may be provided where each circuit would generate a modified input signal, which is processed similarly to the modified input signal, $I_{MOD}$, illustrated in FIG. 6G. In the event that multiple modified input circuits are provided, multiple driving flops in the module would be provided, as illustrated in FIG. 3A, each receiving a modified input signal associated with a different modified input circuit. Accordingly, the modified input signal, $I_{MOD}$, may be received and process by the time multiplexing circuit of FIGS. 3A and 3B, as previously described.

Thus, as illustrated in FIGS. 3A and 3B and provided in the corresponding description previously presented, once it is determined that sufficient flops or latches 50 have been inserted to allow the time multiplexing logic circuit in the module 10 to operate twice the original frequency, for instance, the module 10 would receive the modified input signal, $I_{MOD}$, from the modified input circuit 12, process the modified input signal, $I_{MOD}$, through the driving flop 30, logic units 45, the inserted new flops or latches 50 to the receiving flop 40. The receiving flop 40 would then output an output signal, $O_M$, to the modified output circuitry 20, as illustrated in FIG. 6G. The output signal, $O_M$, is a multiplexed signal being output from the module 10 at the higher or maximum clock frequency of, for instance, 200 MHz. The demultiplexer circuitry (i.e., both latches 22, 24), for instance, would demultiplex the output signal, $O_M$, at a same phase as the phase of the multiplexer 16. The output signal, $O_M$, would be demultiplexed as the first output signal, $O_1$, as illustrated in FIG. 6H, and the second output signal, $O_2$, as illustrated in FIG. 6I.

In accordance with an embodiment of the present invention and as illustrated in FIGS. 5, 6H, and 6I, latch 22 may be a latch that is in flowthrough mode when clock is high and closed (holds_value) when clock is low (i.e., no bubble on clock). In turn, latch 24 may be a latch that is in flowthrough mode when clock is low and closed (holds_value) when clock is high (i.e., bubble on clock). The values from OM are demultiplexed using different phase latches. The values D, U, E, V, F, and W on $O_M$ are shown, for illustrative purposes, propagating through the latches to either $O_1$ or $O_2$. The demultiplexing latches may propagate values D, E, F to O1 and propagate values U, V, W to $O_2$. Thus, for instance, even clocks would route to one output and odd clocks would route to the other clock.

In accordance with an embodiment of the present invention, a demultiplexer may be required before the time multiplexing circuit and a time multiplexer may be required after the replicated custom cells. In addition, asynchronous boundaries may need special consideration. In many cases, the asynchronous boundaries may be treated as custom cells described above. Also, asynchronous reset design has many attributes, such as the same reset is used for both instances of the module, multiple modules may have unique resets, reset may be truly asynchronous, reset may have setup/hold time requirements, the clock may be stable before reset de-assertion, and/or the clock may only start wiggling after reset. Accordingly, modules using asynchronous reset flops need special consideration. When both designs use a common reset and reset is truly asynchronous, there may be no issue. Otherwise, one embodiment may include modifying the original design converting asynchronous reset to synchronous reset. This is more likely to be possible if clock is stable before reset de-assertion. Another embodiment may be to time-multiplex different module resets similar to logic inputs in a synchronous manner perhaps near the end of a very long reset buffer tree. Outputs of truly asynchronous designs may need to include reset in the output demultiplex logic.

In addition, latch based designs may need special consideration. Common phase latches that are back to back may require ignoring one of the latches. Also, modules with multicycle timing constraints need special consideration. One embodiment may be to redesign the original design to eliminate multicycle and false paths. Another embodiment may provide replicating multicycle and false paths. As with custom logic, demultiplex logic is needed at inputs and time multiplex logic is used at the outputs of the replicated portion. Multiclock based designs may need special consideration if they are multicycle.

In accordance with an exemplary embodiment of the present invention, another application of multiple instanced logic is redundancy for reliability/availability. Redundant instanced modules also benefit from the time multiplexing logic method.

It is to be understood that in the embodiment of the present invention, the operations are performed in the sequence and manner as shown although the order of some operations and the like may be changed without departing from the spirit and scope of the present invention.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of performing a time multiplexing in a module, comprising:
   identifying a driving flop and a receiving flop in the module;
   receiving a modified input signal, the modified input signal being based on a first input signal and a second input signal;
   identifying a worst case timing path for the modified input signal to transmit from the driving flop to the receiving flop;
   identifying a predetermined point of the worst case timing path; and
   inserting a logic unit at the predetermined point allowing the time multiplexing logic circuit to process and output the modified input signal at an increased frequency as compared to a frequency of the first input signal and the second input signal.

2. The method as recited in claim 1, further comprising:
   receiving the first input signal and the second input signal; and
   multiplexing the first input signal and the second input signal to generate the modified input signal; and
   outputting the modified input signal.

3. The method as recited in claim 2, further comprising:
   receiving the modified input signal at the driving flop;
   processing the modified input signal through the inserted logic unit; and
   outputting the processed signal through the receiving flop at the increased frequency.

4. The method as recited in claim 3, further comprising:
   providing a demultiplexer configured to receive and demultiplex the processed signal into a first output signal and a second output signal; and
   providing a phase selector configured to control a phase of the modified input signal, the first output signal, and the second output signal.

5. The method as recited in claim 1, further comprising:
   receiving the first input signal and the second input signal;
   delaying the second input signal by a programmable period of time; and
   multiplexing the first input signal and the delayed second input signal to generate the modified output signal; and
   outputting the modified input signal.

6. The method as recited in claim 5, further comprising:
   receiving the modified input signal at the driving flop;
   processing the modified input signal through the inserted logic unit; and
   outputting the processed signal through the receiving flop at the increased frequency.

7. The method as recited in claim 6, further comprising:
   providing a demultiplexer configured to receive and demultiplex the processed signal into a first output signal and a second output signal; and
   providing a phase selector configured to control a phase of the modified input signal, the first output signal, and the second output signal.

8. The method as recited in claim 6, further comprising:
   providing a demultiplexer configured to receive and demultiplex the processed signal into a first output signal and a second output signal; and
   providing a phase selector configured to set a phase of the modified input signal and the first output signal and the second output signal to be the same.

9. The method as recited in claim 1, wherein the predetermined point comprises a midpoint of the worst case timing path, and, if a cell exists at the midpoint, the method further comprises:
   inserting the logic unit after the cell.

10. The method as recited in claim 1, further comprising:
    determining whether another worst case timing path exists from the driving flop to the logic unit.

11. The method as recited in claim 1, further comprising:
    determining whether another worst case timing path exists from the logic unit to the receiving flop.

12. The method as recited in claim 1, further comprising:
    connecting a clock to the logic unit, wherein the clock is configured to operate at the increased frequency;
    identifying whether the logic unit needs to have a reset or a preset using a logic evaluation of a reset state; and
    performing an incremental flop sizing, placing, routing, and parasitic extraction.

13. The method as recited in claim 1, further comprising:
    determining whether additional worst case timing paths exist between at least one of:
    the driving flop and the logic unit; and
    the logic unit and the receiving flop.

14. The method as recited in claim 1, wherein the logic unit comprises flops or latches, and the method further comprises:
    inserting the flops or latches at the predetermined point in pairs.

15. The method as recited in claim 1, wherein the inserting of the logic unit comprises inserting the logic unit at a midpoint of the worst case timing path so that the worst case timing path hits a center of the latch flow through a time period.

16. The method as recited in claim 1, further comprising:
    providing a library for equivalency checking so that a new cell description is a wire from data-in to data-out.

17. A recordable storage medium having recorded and stored thereon instructions that, when executed by a computing device, cause the computing device to perform the actions of:
  identifying a driving flop and a receiving flop in the module;
  receiving a modified input signal, the modified input signal being based on a first input signal and a second input signal;
  identifying a worst case timing path for the modified input signal to transmit from the driving flop to the receiving flop;
  identifying a predetermined point of the worst case timing path; and
  inserting a logic unit at the predetermined point allowing the time multiplexing logic circuit to process and output the modified input signal at an increased frequency as compared to a frequency of the first input signal and the second input signal.

18. The recordable storage medium of claim 17, wherein the instructions, when executed, further provide for:
  receiving the first input signal and the second input signal; and
  multiplexing the first input signal and the second input signal to generate the modified input signal; and
  outputting the modified input signal.

19. The recordable storage medium of claim 18, wherein the instructions, when executed, further provide for:
  receiving the modified input signal at the driving flop;
  processing the modified input signal through the inserted logic unit; and
  outputting the processed signal through the receiving flop at the increased frequency.

20. The recordable storage medium of claim 19, wherein the instructions, when executed, further provide for:
  providing a demultiplexer configured to receive and demultiplex the processed signal into a first output signal and a second output signal; and
  providing a phase selector configured to control a phase of the modified input signal, the first output signal, and the second output signal.

21. The recordable storage medium of claim 17, wherein the instructions, when executed, further provide for:
  receiving the first input signal and the second input signal;
  delaying the second input signal by a programmable period of time; and
  multiplexing the first input signal and the delayed second input signal to generate the modified input signal; and
  outputting the modified input signal.

22. The recordable storage medium of claim 21, wherein the instructions, when executed, further provide for:
  receiving the modified input signal at the driving flop;
  processing the modified input signal through the inserted logic unit; and
  outputting the processed signal through the receiving flop at the increased frequency.

23. The recordable storage medium of claim 22, wherein the instructions, when executed, further provide for:
  providing a demultiplexer configured to receive and demultiplex the processed signal into a first output signal and a second output signal; and
  providing a phase selector configured to control a phase of the modified input signal, the first output signal, and the second output signal.

24. The recordable storage medium of claim 22, wherein the instructions, when executed, further provide for:
  providing a demultiplexer configured to receive and demultiplex the processed signal into a first output signal and a second output signal; and
  providing a phase selector configured to set a phase of the modified input signal and the first output signal and the second output signal to be the same.

25. A module, comprising:
a time multiplexing logic circuit configured to:
identify a driving flop and a receiving flop in the module;
receive a modified input signal, the modified input signal being based on a first input signal and a second input signal;
identify a worst case timing path for the modified input signal to transmit from the driving flop to the receiving signal;
identify a predetermined point of the worst case timing path; and
insert a logic unit at the predetermined point allowing the time multiplexing logic circuit to process and output the modified input signal at an increased frequency as compared to a frequency of the first input signal and the second input signal.

26. The module as recited in claim 25, further comprising:
a multiplexer configured to:
receive and multiplex the first input signal and the second input signal;
generate the modified input signal based on the first input signal and the second input signal; and
output the modified input signal.

27. The module as recited in claim 26, wherein:
the driving flop receives the modified input signal;
the inserted logic unit processes the modified input signal; and
the receiving flop outputs the processed signal at the increased frequency.

28. The module as recited in claim 27, further comprising:
a demultiplexer configured to receive and demultiplex the processed signal into a first output signal and a second output signal; and
a phase selector configured to control a phase of the modified input signal, the first output signal, and the second output signal.

29. The module as recited in claim 27, further comprising:
a demultiplexer configured to receive and demultiplex the processed signal into a first output signal and a second output signal; and
a phase selector configured to set a phase of the modified input signal, the first output signal and the second output signal to be the same.

30. The module as recited in claim 25, further comprising:
a delay unit configured to receive and delay the first input signal; and
a multiplexer configured to:
  receive and multiplex the second input signal and the delayed first input signal to generate the modified input signal; and
  output the modified input signal.

31. The module as recited in claim 30, wherein:
the driving flop is configured to receive the modified input signal;
the inserted logic unit is configured to process the modified input signal; and
the receiving flop is configured to output the processed signal at the increased frequency.

32. The module as recited in claim 31, further comprising:
a demultiplexer configured to receive and demultiplex the processed signal into a first output signal and a second output signal; and
a phase selector configured to control a phase of the modified input signal, the first output signal, and the second output signal.

33. The module as recited in claim 31, further comprising:
a demultiplexer configured to receive and demultiplex the processed signal into a first output signal and a second output signal; and
a phase selector configured to set a phase of the modified input signal, the first output signal and the second output signal to be the same.

34. The module as recited in claim 25, wherein the time multiplexing logic circuit is configured to determine whether another worst case timing path exists from the logic unit to the receiving flop.

35. The module as recited in claim 25, further comprising:
a clock coupled with the logic unit, the clock being configured to operate at the increased frequency, wherein the time multiplexing logic circuit identifies whether the logic unit needs to have a reset or a preset using a logic evaluation of a reset state, and performs an incremental flop sizing, placing, routing, and parasitic extraction.

36. The module as recited in claim 25, wherein the time multiplexing logic circuit is configured to determine whether additional worst case timing paths exist between at least one of:
the driving flop and the logic unit; and
the logic unit and the receiving flop.

37. The module as recited in claim 25, wherein the logic unit comprises flops or latches.

38. The module as recited in claim 25, wherein the logic unit is inserted at a midpoint of the worst case timing path so that the worst case timing path hits a center of the latch flow through a time period.

39. The module as recited in claim 25, further comprising:
a library for equivalency checking so that a new cell description is a wire from data-in to data-out.

40. A module for performing time multiplexing, the module comprising:
means for identifying a driving flop and a receiving flop in the module;
means for receiving a modified input signal, the modified input signal being based on a first input signal and a second input signal;
means for identifying a worst case timing path for the modified input signal to transmit from the driving flop to the receiving flop;
means for identifying a predetermined point of the worst case timing path; and
means for inserting a logic unit at the predetermined point allowing the time multiplexing logic circuit to process and output the modified input signal at an increased frequency as compared to a frequency of the first input signal and the second input signal.

* * * * *